United States Patent [19]
Hollander

[11] Patent Number: 5,301,858
[45] Date of Patent: Apr. 12, 1994

[54] COMBINATION WATER BOTTLE

[76] Inventor: Douglas S. Hollander, 12 East 86th St. #704, New York, N.Y. 10028

[21] Appl. No.: 856,760
[22] Filed: Mar. 24, 1992
[51] Int. Cl.$^5$ ............................ A45F 3/18; B62J 11/00
[52] U.S. Cl. .................................. 224/148; 224/32 R; 224/39
[58] Field of Search .................. 224/32 R, 35, 36, 39, 224/148, 157; 215/1 A, 1 C, 2, 6, 229; 220/4.27

[56] References Cited

U.S. PATENT DOCUMENTS

| | | |
|---|---|---|
| D. 316,389 | 4/1991 | Wood . |
| 581,767 | 5/1897 | Powers . |
| 880,082 | 2/1908 | Kendrick ............................ 215/6 |
| 4,090,650 | 5/1978 | Gotta . |
| 4,095,812 | 6/1978 | Rowe ............................ 224/32 R |
| 4,139,130 | 2/1979 | Glusker et al. .................... 224/148 |
| 4,274,566 | 6/1981 | Rowe . |
| 4,607,755 | 8/1986 | Andreozzi .................... 224/148 X |
| 4,815,635 | 3/1989 | Porter . |
| 4,883,205 | 11/1989 | Saelens . |
| 4,911,339 | 3/1990 | Cushing . |
| 5,024,358 | 6/1991 | Reichert et al. ................. 224/32 R |
| 5,048,705 | 9/1991 | Lynd et al. ....................... 215/229 |
| 5,060,833 | 10/1991 | Edison et al. .................... 215/1 A |
| 5,062,591 | 11/1991 | Runkel ............................. 224/32 R |
| 5,115,952 | 5/1992 | Jenkins ............................. 224/35 |
| 5,119,978 | 6/1992 | Kalamaras et al. ............... 224/32 R |

FOREIGN PATENT DOCUMENTS 2150814 7/1985 United Kingdom .
0006724 5/1990 United Kingdom .

*Primary Examiner*—Renee S. Luebke
*Attorney, Agent, or Firm*—Kevin M. O'Brien; Ruffin B. Cordell

[57] ABSTRACT

A recreational water bottle system which includes a primary vessel for holding liquids, a watertight cap having a bottle tube extending therethrough into the primary vessel, a drinking tube for delivering liquids to a user, and an oversleeve adapter disposed between the bottle tube and the drinking tube for passing liquids and for selectively holding the bottle tube and the drinking tube in structural alignment. The system is adapted to be selectively mounted onto the frame of a bicycle or onto the body of an athlete, or used as a hand held sport bottle.

18 Claims, 7 Drawing Sheets

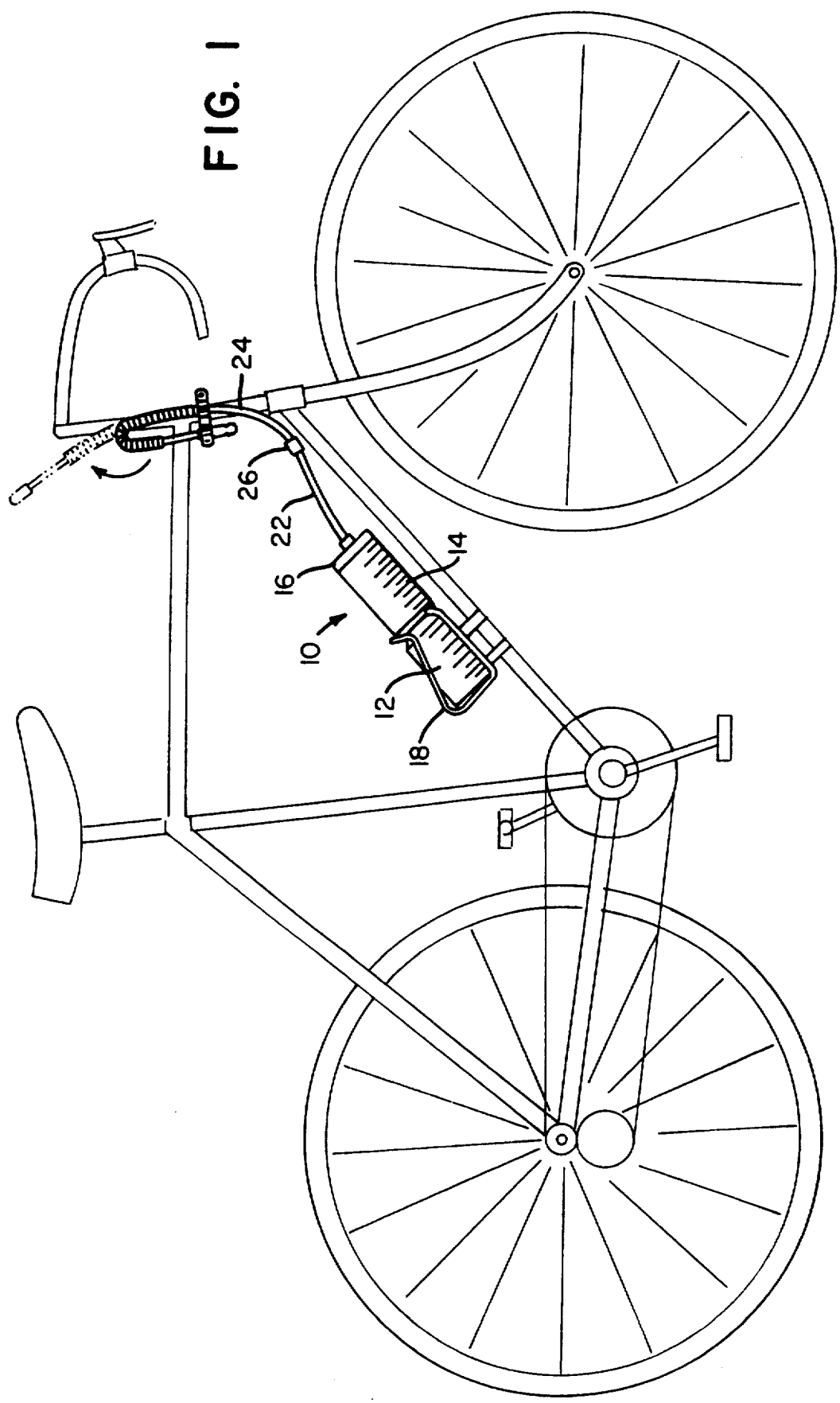

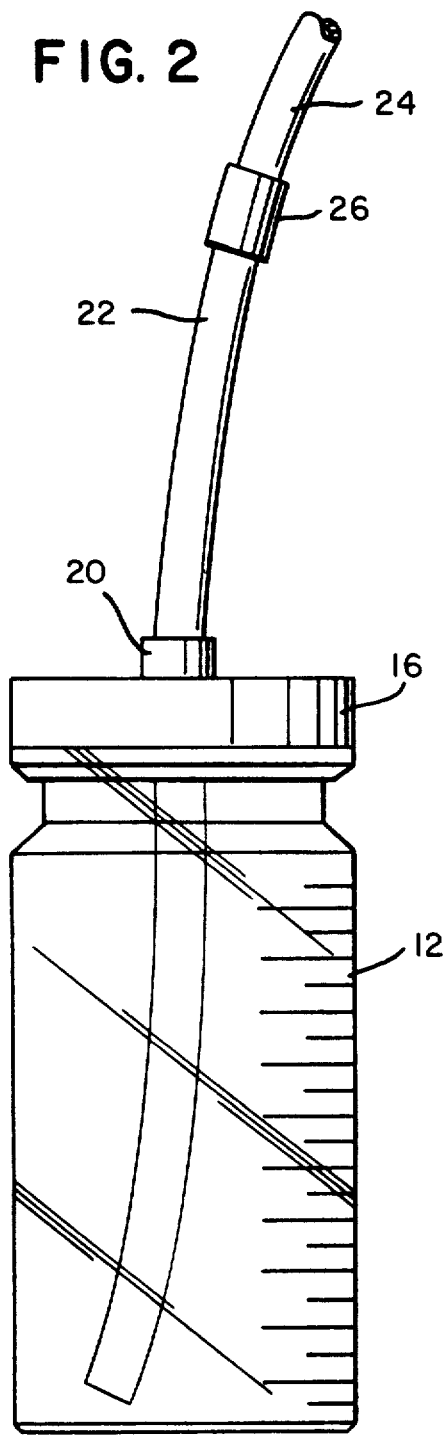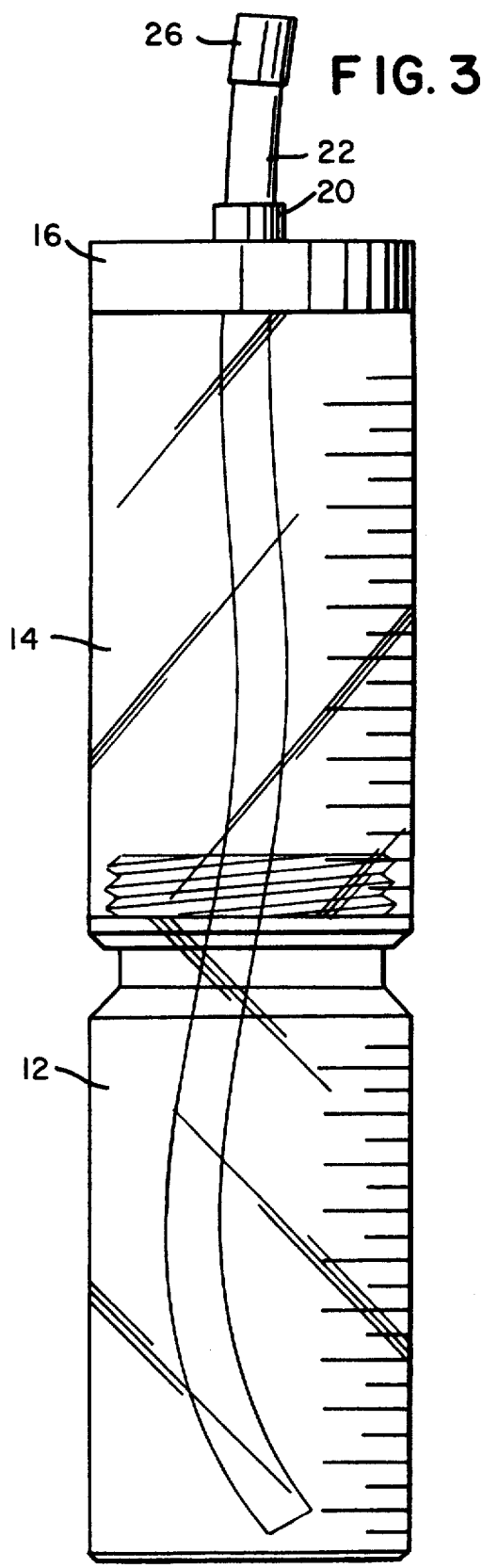

FIG. 9
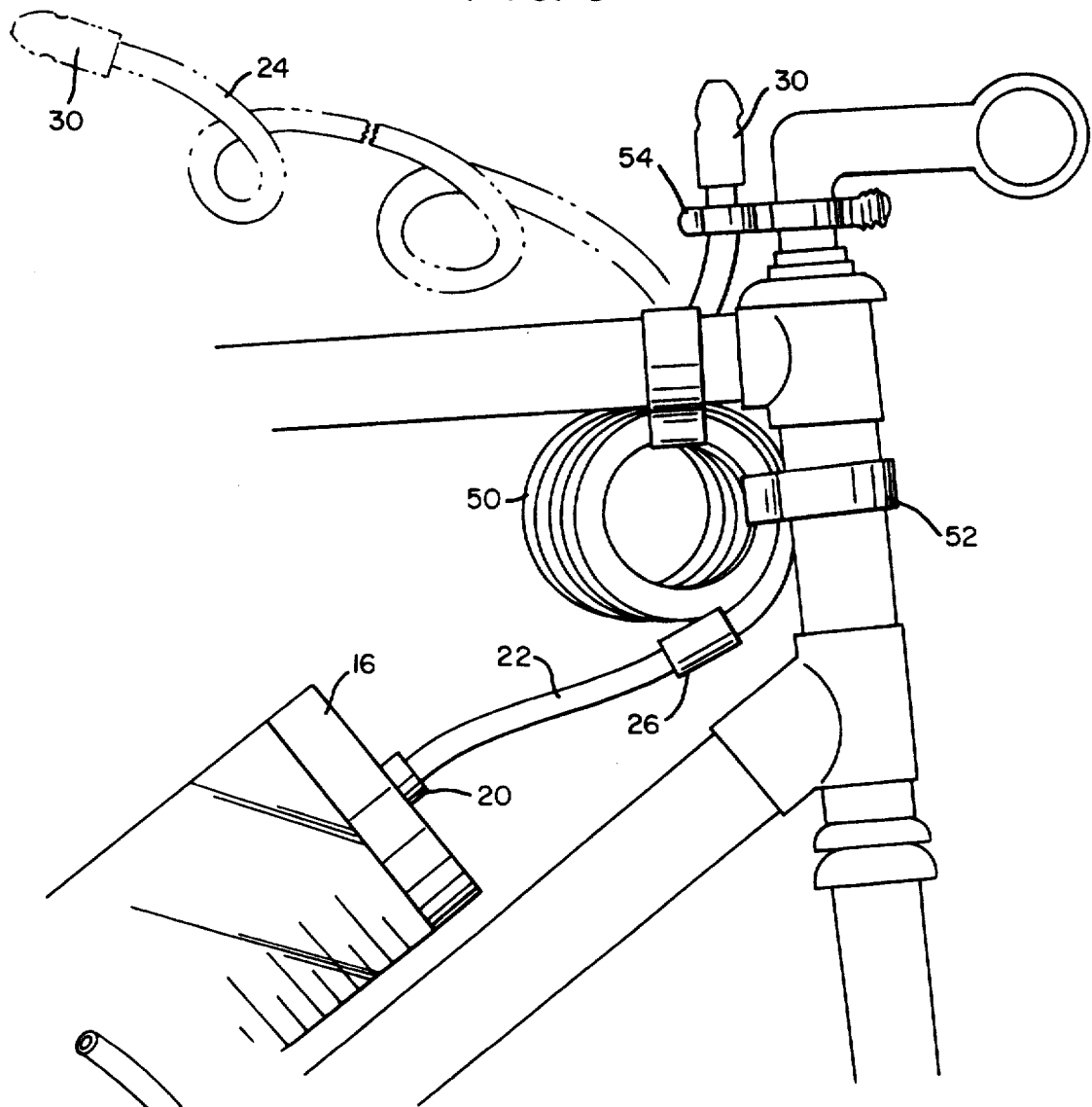
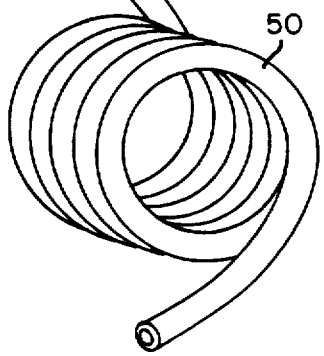
FIG. 9a
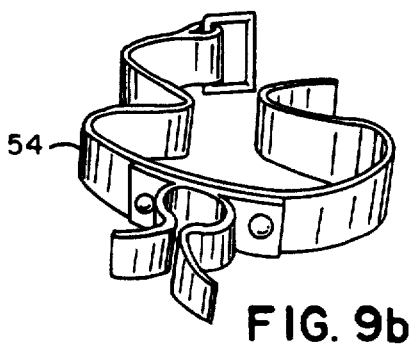
FIG. 9b

FIG. 10
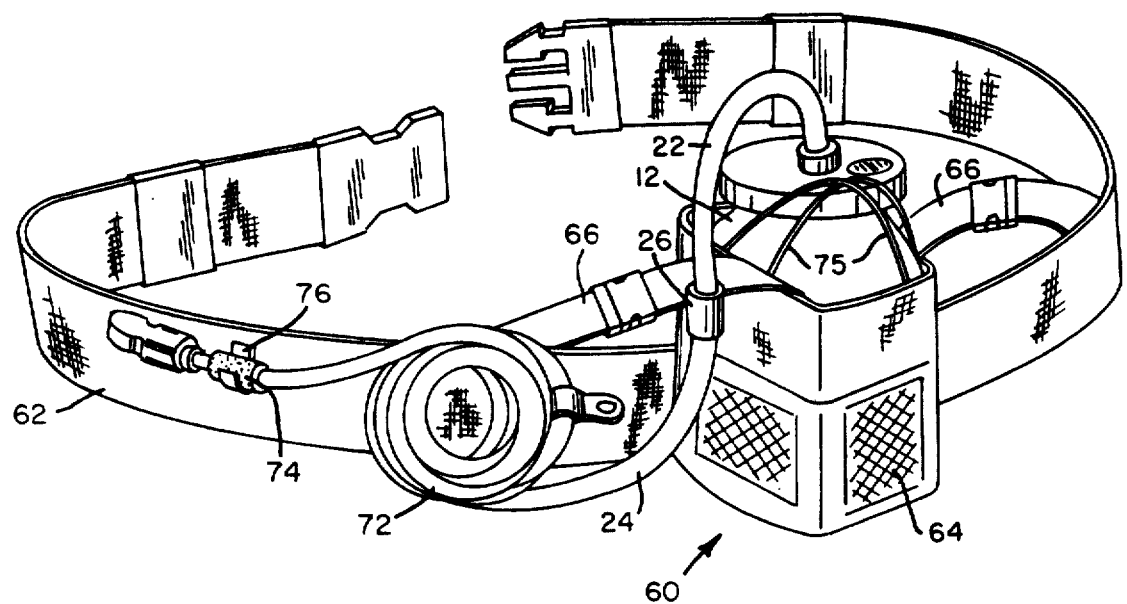
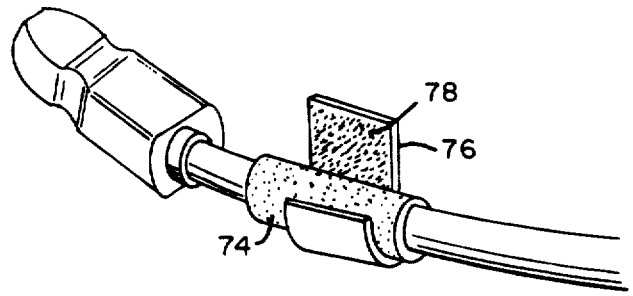
FIG. 10a
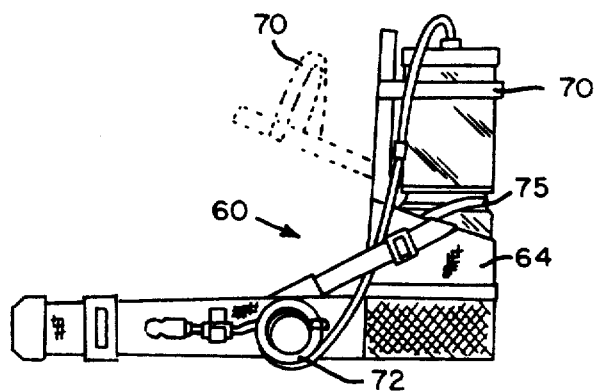
FIG. 10b

COMBINATION WATER BOTTLE

BACKGROUND OF THE INVENTION

The present invention relates to a bottle for carrying liquids during periods of exercise including the riding of a bicycle and jogging or running. The invention is more specifically suited to a combination device which accommodates an athlete engaged in both bicycling and running during the same exercise period.

In the last ten years, the popularity of bicycling, running and other forms of multi-sport exercise has grown significantly. In addition, the popularity of triathlons, duathlons, cross-training, and other combined forms of exercise has increased considerably. In the case of triathlons, athletes engage in swimming, cycling, and running in consecutive segments of a single timed competition. In duathlons, also called biathlons, athletes compete in a series of running, cycling, and running events in a single timed competition. In both training and competition, these athletes must be able to transfer from running to cycling to running again quickly and efficiently.

FIELD OF THE INVENTION

Several persons in the past have attempted to address the need for a versatile water bottle for use in physical exercise. A U.S. Pat. No. to Saelens, et al., 4,883,205, discloses the basic configuration of a water bottle for use while riding a bicycle. The system consists of a bottle compartment for holding liquids together with a mounting rack which allows the bottle to be mounted on the frame of a bicycle for use while engaged in exercise. However, because the bottle must be removed from its mounting prior to use, drinking is a difficult and sometimes hazardous procedure. Bottle extraction requires the rider to be distracted from riding the bicycle and direct his attention down to the bicycle frame where the water bottle is typically mounted. The disengagement of the water bottle is an awkward and clumsy procedure which may further distract the rider. The rider must shift his or her weight downward while twisting to reach the bottle, reducing the stability of the rider/bicycle system. All of these distractions may lead the cyclist to an accident or may diminish his overall performance if engaged in racing competition. In addition, the distraction and difficulties attendant using a bottle mounted onto the frame will lead the rider to drink less frequently and may thereby diminish his overall physical performance due to sub-optimal hydration.

Two U.S. Pat. Nos. to Rowe, 4,095,812 and 4,274,566, attempt to address the difficulties associated with using a water bottle during exercise which must be removed from its storage frame prior to use. In Rowe '812, there is disclosed a water bottle which is provided with an extendable tube which may be positioned to allow the rider to drink without removing the bottle from its mounting on a bicycle frame. The extendable tube is shown in several embodiments including a simple coil structure, a telescoping straw apparatus, and a spring-mounted tube reel. In Rowe '566, there is disclosed an elaborate dual pulley mechanism whereby the drinking tube is retracted back into a bulky housing. In each of these cases, the rider is provided with the facility of drinking without removing the bottle from its frame. However, the embodiments set forth by Rowe to store the drinking tube when not in use and maintain it in a desired position are not satisfactory. In addition, none of the disclosures of Rowe suggest a mechanism whereby the bottle may be used for exercise applications not involving a bicycle.

An early attempt to satisfy some of the inadequacies in the prior art was set forth by Powers in U.S. Pat. No. 581,767. In Powers, there is disclosed a bicycle drinking tank which includes an elongated drinking tube mounted on a hinge. The tube may be swung in and out of position as desired by the rider and is held in position by frictional engagement. Again, there is no provision in the Powers device for utilization of this apparatus in physical activity other than bicycle riding. In fact, the Powers device is ill suited for removal from a bicycle in any case.

A variation on this theme is set forth in the U.S. Pat. No. to Reichert 5,024,358. The Reichert device sets forth an elongated water container mounted to the bicycle frame which is provided with an extended drinking tube. The drinking tube is mounted over the bridge of the handlebars to hold it in position in front of the rider. Again, the Reichert device makes no facility for use of the water bottle away from its bicycle frame mounting.

A further variation on this theme is set forth in U.S. Pat. No. 4,911,339 to Cushing. The Cushing device consists of a frame-mounted water bottle and elongated tube which includes a bellows to compress the air and liquid within the bottle cavity. Liquid is thereby forced up the tube to the rider upon operation of a hand valve.

Several attempts have been made to produce a water bottle suitable for use while engaged in running, jogging or other exercise on foot. The patent to Gotta, U.S. Pat. No. 4,090,650, discloses a man-portable water device which mounts on the belt of a user. An elongated straw is provided which allows the user to drink without removing the canteen from its belt-mounted position. The straw is pushed back down into the canteen when not in use to avoid interfering with the activities of the user. The bottle disclosed in Gotta is limited strictly to man-portable applications and is adapted to fit snugly around the waist of the user.

A similar device is disclosed in Glusker, U.S. Pat. No. 4,139,130. In Glusker there is disclosed a canteen belt wherein the water-containing compartment is extended around the waist of the user. An elongated straw is provided with an attachment to hold it in place when not in use. The user may drink without removing the container from his waist. The canteen is an integral part of the belt to be worn around the waist of the user and is not provided with further mounting structure.

A further belt-supported bottle device is described in the patent to Shurnik, U.S. Pat. No. 4,852,781. This device includes an elaborate intake vent to avoid spillage. Again, no provision is made for use of the device away from its belt mount position.

As will be understood, the recreational water bottle of this invention overcomes many of the disadvantages of the prior art. The difficulties and limitations suggested in the proceeding are not intended to be exhaustive but rather among the many which may tend to reduce the effectiveness and user satisfaction with prior recreational water bottles and the like. Other noteworthy problems may also exist, however, those presented above should be sufficient to demonstrate that prior recreational water bottles appearing in the past will admit to worthwhile improvement.

SUMMARY OF THE INVENTION

In contrast to the prior art devices which have attempted to address the need for a combination running/cycling and improved water bottle, the present invention is particularly, although not exclusively, adapted for use by athletes engaged in exercise both on bicycle and on foot.

In the preferred embodiment, the present invention consists of an improved bicycle water bottle which includes unique mounting features, unique fitting features, and a unique delivery system to allow an athlete to obtain liquids while engaged in exercise. The present invention efficiently and safely delivers liquids to the rider in an unencumbered manner during physical activities. It is designed to alleviate the inherent hazards and pitfalls associated with drinking during exercise using prior art devices.

A primary advantage of the present invention is its adaptability to exercise both on and off a bicycle.

A further advantage of the present invention is its simple, yet elegant, design which complements bike frame structure while solving existing hydration problems.

A still further advantage of the present invention is its ability to work as a two-stage bottle which can be used with either single or double liquid capacity based on rider requirements.

An additional advantage of the present invention is its provision of a bottle vent structure which prevents the build-up of a vacuum within the bottle cavity during fluid extraction.

Another advantage of the present invention lies in its adaptability for use as a hand-held sport bottle.

A still further advantage of the present invention is that the bottle can be quickly installed on and detached from a bicycle to provide for exercise on and off the bicycle.

A still further advantage of the present invention is a body mounted position to provide for hands-free use while engaged in running, skating or other foot-bound exercise.

The present invention is preferably constructed of rugged, lightweight plastic and utilizes traditional plastic molding technology. The basic components are a water bottle structure coupled with an elongated drinking tube and unique adaptor assembly which facilitates installation and removal from the bicycle. A drinking tube is provided with a novel positioning mechanism which allows the rider to utilize the drinking tube position most well suited to his or her particular preference.

OBJECTS OF THE INVENTION

It is therefore a general object of the invention to provide a novel recreational water bottle or the like which will obviate or minimize the problems previously described with reference to the prior art.

It is a specific object of the invention to provide a novel recreational water bottle which will be adaptable to exercise both on and off of a bicycle.

It is another object of the invention to provide a novel recreational water bottle which may be advantageously used by athlete engaged in combination cycling/running exercise training sessions and competitive events.

It is still another object of the invention to provide a recreational water bottle which facilitates the taking of liquids by an athlete while riding a bicycle.

It is a still further object of the invention to provide a recreational water bottle with a drinking tube which may be positioned advantageously at the preference of a bicycle rider.

It is a still further object of the invention to provide a recreational water bottle which includes a two-stage water cavity to allow for increased storage capacity.

It is a related object of the invention to provide a recreational water bottle which includes an adapter facilitating the rapid removal, transition, and installation from a bicycle mounted position to a body mounted position during exercise.

It is a related object of the invention to provide a recreational water bottle which includes an adapter facilitating the rapid removal, transition, and installation from a body mounted position to a bicycle mounted position during exercise.

It is a further object of the invention to provide a recreational water bottle adapted for use as a hand-held sport bottle.

Other advantages and meritorious features of the present invention will be understood from the following description of the preferred embodiments, the appended claims, and the drawings, the brief description of which follows.

BRIEF DESCRIPTION OF THE DRAWINGS

FIG. 1 is a side view of the water bottle of the present invention showing its mounting position on a bicycle;.

FIG. 2 is a side view of the recreational water bottle of the present invention showing the details of its construction;

FIG. 3 is a side view of the recreational water bottle of the present invention showing the present invention in its expanded configuration;

FIG. 9 is a close-up view of a third tube-positioning mechanism of the present invention;

FIG. 9a is a perspective view of the memory flex tubing of the present invention;

FIG. 9b is a perspective view of a mounting clip of the present invention;

FIG. 10 is a perspective view of the present invention when mounted in the running mode of operation with close up views of the extender structures and mouthpiece retention means.

FIG. 10a is a perspective view of the hook and pile fastener and J hook of the present invention; and FIG. 10b is a side view of the body mounted carrier of the present invention showing the extension strap.

DETAILED DESCRIPTION OF THE INVENTION

Figure 4:
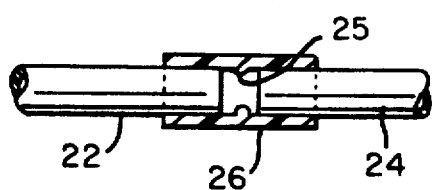
FIG. 4 is a cross-sectional view of the adapter of the present invention.

Referring to FIGS. 1 and 2, the recreational water bottle system 10 of the present invention is shown to include a primary water bottle 12. In the basic system configuration, the primary water bottle 12 is the only liquid-carrying vessel provided. As may be seen more clearly in FIG. 3, an alternative system in its extended mode utilizes an extension sleeve 14 to produce a two-compartment water-carrying vessel. Situated at the upper end of extension sleeve 14 in FIG. 3 is threaded cap 16. As may be seen in FIGS. 2 and 3, threaded cap 16 is adapted to fit onto the upper end of primary vessel 12 or alternatively onto the upper end of extension sleeve 14. The interrelationship between extension sleeve 14 and primary vessel 12 is accomplished by screwing the lower end of extension sleeve 14 onto the upper threads of primary vessel 12. Both primary vessel 12 and extension sleeve 14 are provided with volumetric markings on the side thereof to allow an athlete to monitor his liquid consumption during exercise. Primary vessel 12 is mounted to the bicycle through mounting cage 18. Mounting cage 18 is a conventional quick release design.

Figure 5:
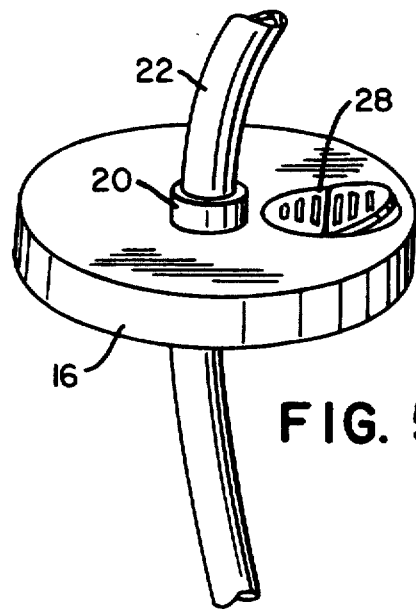
FIG. 5 is a close-up view of the cap and vent structures of the present invention.

In the center of threaded cap 16 there is provided a watertight flange 20 as shown in FIG. 5. Watertight flange 20 is adapted to receive bottle tube 22 in a close frictional fit. Tube 22 extends into the bottom of primary vessel 12 to allow for the extraction of fluids from the container. If extension sleeve 14 is in use, bottle tube 22 extends through both extension sleeve 14 and primary vessel 12. Watertight flange 20 prevents liquid from escaping from the bottle cavity while in use. Threaded cap 16 includes a closable rocker vent 28 which permits air to enter the bottle cavity to avoid the buildup of a vacuum during drinking.

At the upper end of bottle tube 22 there is provided an adapter oversleeve 26. Above oversleeve 26 is another length of tubing designated as drinking tube 24. Drinking tube 24 may be sized according to the preference of the user. Oversleeve 26 is constructed of high strength plastic or rubber and consists of two female flange portions with a communicating passage therebetween as shown in FIG. 4. The inner diameter of oversleeve 26 is matched to the outer diameter of bottle tube 22 and upper drinking tube 24. Tubes 24 and 22 are inserted until they abut against tube stop 25. The flange portions of oversleeve 26 are adapted to receive the respective ends of bottle tube 22 and upper drinking tube 24 in a firm frictional fit. When assembled as described, oversleeve 26 creates an airtight link between bottle tube 22 and upper drinking tube 24, allowing the user to draw liquids up through the system.

In use, oversleeve 26 permits transfer of bottle system 10 between running and cycling activities quickly and efficiently. By simply detaching the upper flange of oversleeve 26 from the lower end of drinking tube 24 and removing the bottle from mounting cage 18, the bottle system 10 is suitable for use in the body mounted mode of operation or as a hand-held sport bottle.

Figure 6A:
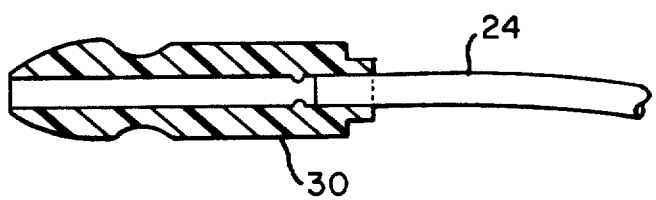
FIG. 6a is a side cross sectional view of the mouthpiece of the present invention.
Figure 6B:
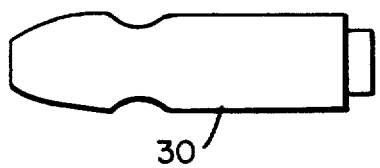
FIG. 6b is a side view of the mouthpiece of the present invention.
Figure 6C:
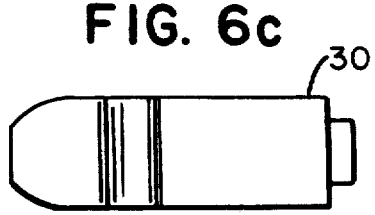
FIG. 6c is a top plan view of the mouthpiece of the present invention.
Figure 6E:
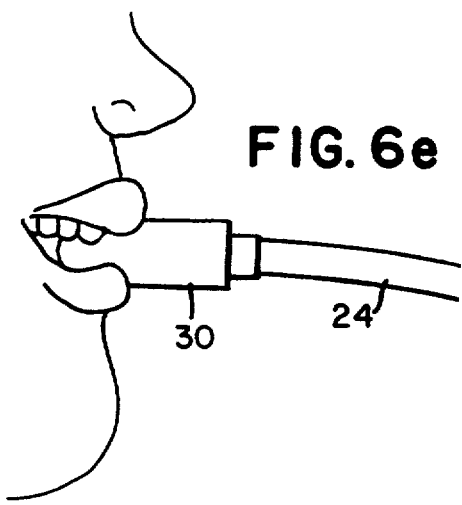
FIG. 6e is a side view of the mouthpiece of the present invention when inserted within a user's mouth.
Figure 6D:
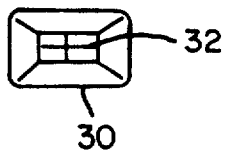
FIG. 6d is a front view of the mouthpiece of the present invention.

Upper drinking tube 24 is provided with an ergonomically designed mouthpiece 30 at its upper end. Mouthpiece 30 is of unique construction and is made of high strength molded plastic. By reference to FIG. 6a, it can be seen the mouthpiece 30 is bullet shaped in cross section. In overall configuration, mouthpiece 30 is a rounded rectangle and is provided with an annular depression 1-2 centimeters from its opening. This shape allows a user to grip the mouthpiece in his or her mouth, avoiding leakage and ensuring ease of use as shown in FIG. 6c. The tip of mouthpiece 30 is provided with one-way valve 32. One-way valve 32 retains fluid in the whole of the system, including upper drinking tube 24 after the first use. This permits further use without re-priming the system, facilitating the overall function of the device.

Figures 7, 7A:
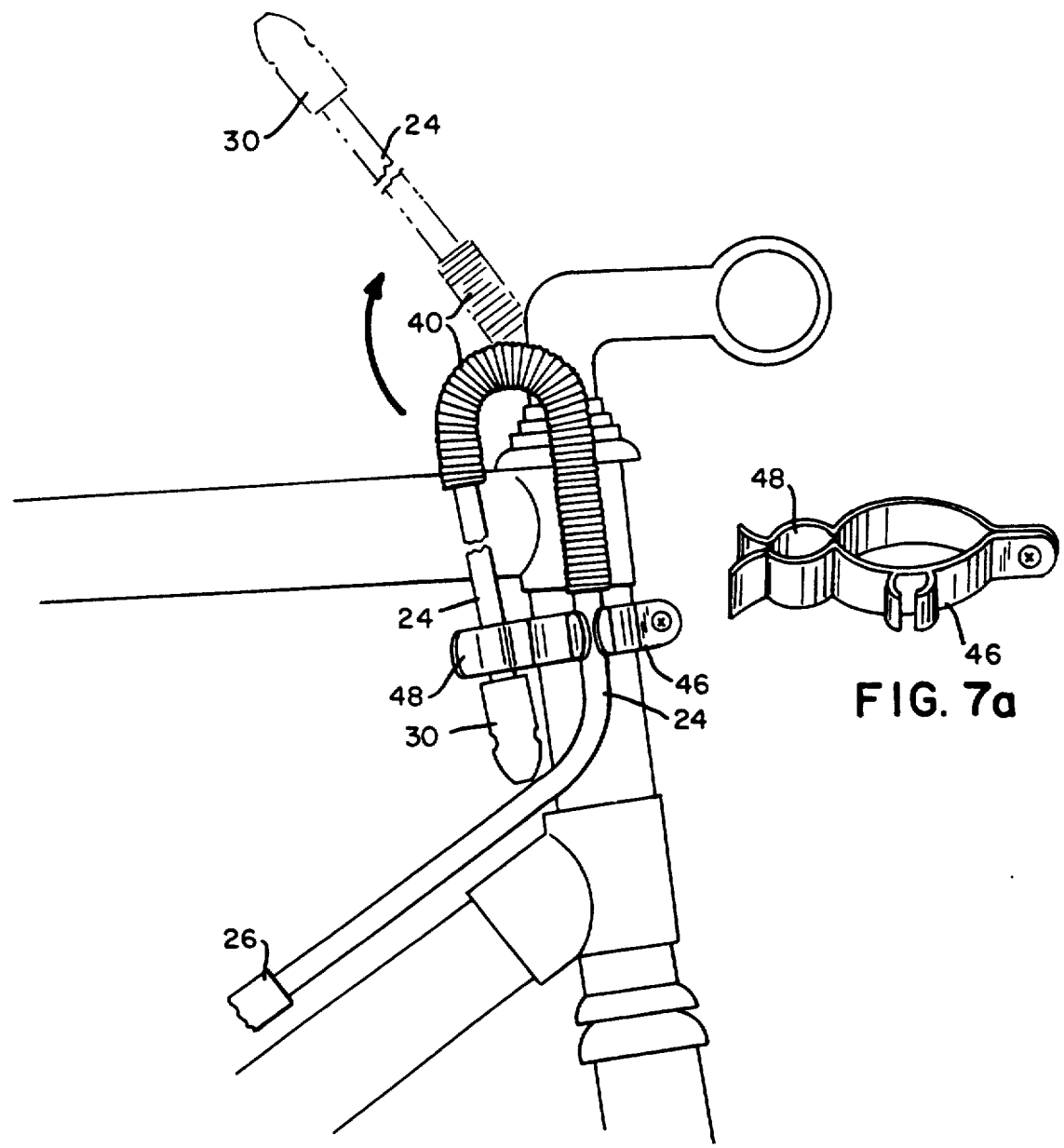
FIG. 7 is a close-up view of a first tube-positioning mechanism of the present invention.
FIG. 7A is a mounting clip to attach the drinking tube to the bicycle frame.

Upper drinking tube 24 may take several configurations. First, in a preferred embodiment, upper drinking tube 24 may be mounted on the forward vertical bar of the bicycle as shown in FIG. 7. In this configuration, upper drinking tube 24 is provided with a spring sleeve 40 several centimeters from the upper end of the tube. Spring sleeve 40 is biased with its relaxed position in its fully extended state. Alternatively, memory flex tubing may be used to bias drinking tube 24 in its extended state. Spring sleeve 40 extends upper drinking tube 24 into a vertical position unless restrained. Spring sleeve 40 and drinking tube 24 are mounted to the bicycle frame at the vertical forward bicycle tube as shown in FIG. 7 through a mounting clip 46. Spring sleeve 40 is disposed around upper drinking tube 24. When it is desired to store upper drinking tube 24 and mouthpiece 30 out of the way, the assembly is bent downward over the frame of the bicycle as shown in FIG. 7 to engage molded clip 48 which receives upper drinking tube 24 in a firm frictional fit.

Figure 8:
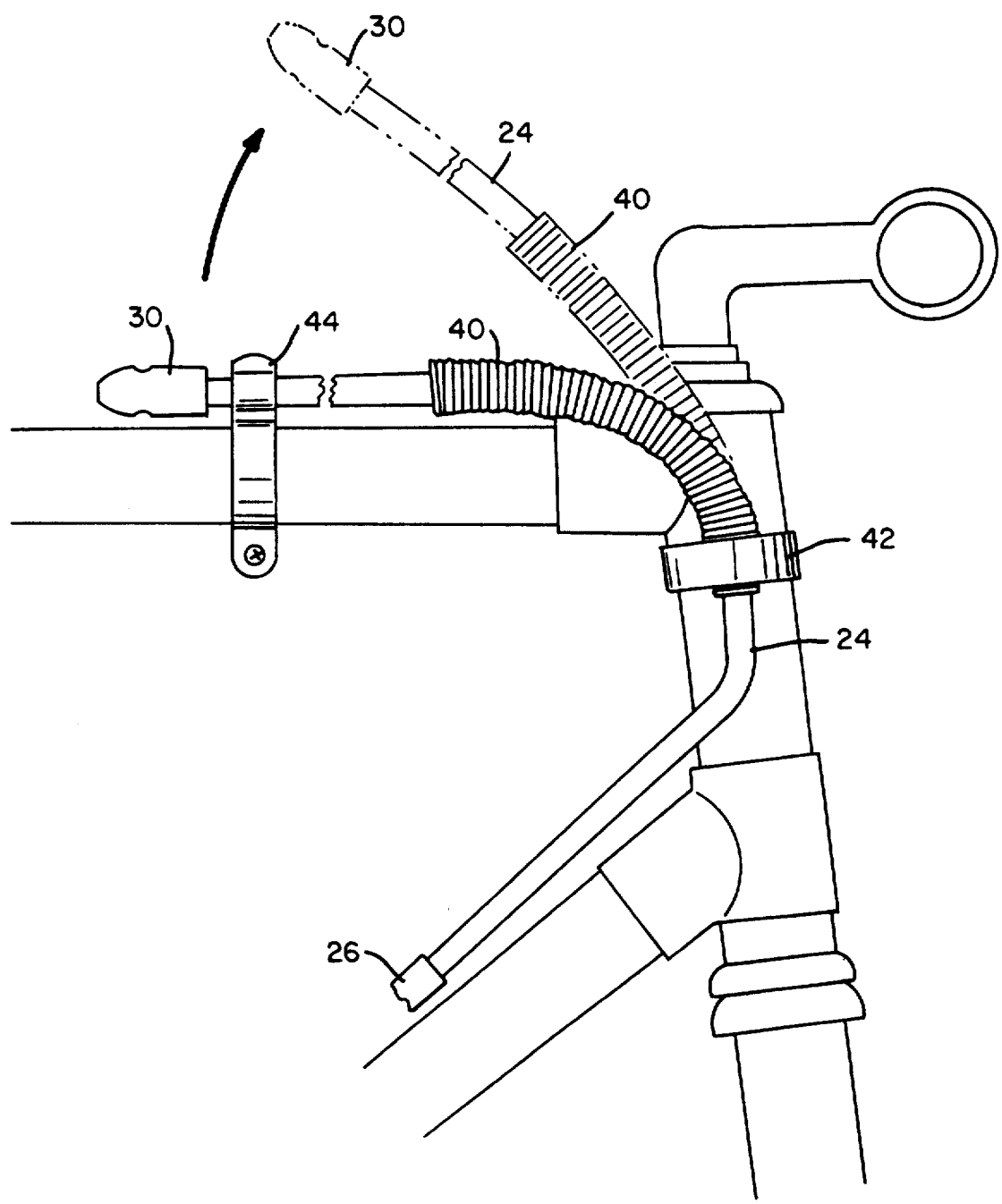
FIG. 8 is a close-up view of a second tube-positioning mechanism of the present invention.

A second embodiment of upper drinking tube 24 is shown in FIG. 8. Here, mounting clip 46 is replaced by clips 42 and 44. Mounting clip 42 is attached to the front vertical bar of the bicycle and includes a receptacle for the portion of the drinking tube just below spring sleeve 40. Clip 44 includes a frictional clip which is adapted to receive the portion of upper drinking tube 24 just below mouthpiece 30 as shown in FIG. 8.

A third embodiment of upper drinking tube 24 is shown in FIG. 9. In this embodiment, upper drinking tube 24 is made of memory flex tubing 50. Memory flex tubing 50 returns to a tightly coiled shape after extension without the aid of external springs or mechanisms. The first loop of memory flex tubing 50 closest to oversleeve 26 is attached to the bicycle frame using clip 52. The portion of upper drinking tube 24 just below mouthpiece 30 is received in clip 54 which is mounted to the handle bar stem of the bicycle as shown in FIG. 9. In use, the rider will remove the mouthpiece and tubing from clip 54 and extend memory flex tubing to his or her mouth. After drinking, the mouthpiece and tubing are replaced into clip 54. Because memory flex tubing 50 recoils into its same tight shape, upper drinking tube 24 is stored neatly and compactly against the bicycle frame.

The bicycle mounted configuration constitutes a first mode of the present invention. A second mode of the present invention is shown in FIG. 10. This embodiment is known as the body mounted mode. Because of the unique structure of the oversleeve of the present invention, the recreational water bottle system 10 is adapted to be used both on and off of a bicycle. In the bicycle mode, the device is used as described above. In the body-mounted mode, the drinking tube 24 is disconnected from oversleeve 26, and the water bottle 12 is removed from cage 18. The bottle 12 is then installed into a body mounted carrier 60 as will be described. .

As may be seen in FIG. 10, body mounted carrier 60 includes a quick release, adjustable nylon belt 62 which is provided with a bottle compartment 64. Stabilization straps 66 are provided to prevent movement of the water bottle 12 during exercise to avoid discomfort from jarring movement of bottle 12. Bottle compartment 64 is adapted to receive primary vessel 12, however, bottle compartment 64 is also provided with extension strap 70 to securely receive extension sleeve 14 if desired as shown in FIG. 10b. Carrier 60 also includes two elastic retention straps 75 which firmly hold bottle 12 in place when placed into bottle compartment 64.

Upper drinking tube 24 in the body mounted mode is most advantageously constructed of memory flex tubing 72, much in the manner of the embodiment of FIG. 9. The loop of tubing closest to oversleeve 26 is attached to belt 62. The portion of upper drinking tube 24 just below mouthpiece 30 is provided with a pile wrapping 74 for a hook and pile fastener, for example, Velcro ®. As shown in FIG. 10a, belt 62 is further provided with a "j" hook clip 76 which is provided with the hook portion 78 of a hook and pile fastener on the interior facing thereof. The "j" hook 76 thus securely receives the mouthpiece and tubing by engaging pile 74.

In use, the mouthpiece 30 is removed from "j" hook 76 and memory flex tubing 72 is extended to the mouth of the user. After drinking, mouthpiece 30 is replaced within "j" hook 76 to again securely engage the hook and pile fastener 74, 78.

In use, a rider seeking to transfer water bottle 12 from the bicycle mounted mode to the body mounted mode will simply disconnect bicycle upper drinking tube 24 from oversleeve 26 and remove bottle 12 from cage 18. After inserting bottle 12 into holder 64, body mount upper drinking tube 24 is inserted into oversleeve 26. This transition requires only moments and may be easily accomplished in reverse order to effect the transition from body mounted mode to bicycle mounted mode. Thus, the present invention is uniquely adapted to transitions between cycling and running during a single exercise period.

A third mode of operation of the present invention is achieved by detaching bottle 12 from upper drinking tube 24 to form a hand-held sport bottle in the form shown in FIG. 3. During pre-exercise warm-up and post-exercise cooling periods, it is desirable to have access to a source of hydration. By detaching oversleeve 26 from upper drinking tube 24, the user may use bottle 12 advantageously as a hand-held sport bottle and then replace the bottle 12 into either of the bicycle mounted mode or the body mounted mode of FIG. 10 for further use in recreation or exercise.

SUMMARY OF THE PRIMARY ADVANTAGES

In use, the recreational water bottle system of the present invention provides a novel and advantageous alternative to existing water bottle systems. The uniquely adaptable structures of the present invention allow a user to transfer from bicycle to foot bound exercise, and vice versa, without requiring an additional water bottle system. Total liquid consumption may be closely monitored during the course of exercise. Only a single source of hydration is required for the combined activity reducing preparation time. The bottle of the present invention may also be used as a hand-held sport bottle. The unique structure of the present invention supports a rapid transition between hand-held position and a bicycle or body mounted position. The components of the present invention are ergonomically designed taking into account physiological factors in choosing shape and placement of each part. The overall system is one which provides liquid to the athlete without distraction or disruption of exercise. This is especially important when engaged in multi-sport training, competition, or while negotiating hazardous urban roadways. The user need not employ his hands while drinking, and further, he need not take his eyes off of the track or road. Balance and concentration are not disrupted, enhancing overall performance.

The unique structures of the present invention offer for the first time a true "cross training" sport bottle. Those engaged in combination forms of exercise can use a single water bottle as a source of effective, safe hydration while running and cycling during a single exercise period. This added versatility is especially significant for triathletes and duathletes who must train alone over long distances. The recreational water bottle of the present invention transfers easily from bicycle to body mount and then back to bicycle again, if desired, with only a simple adapter manipulation. In many forms of exercise, total liquid consumption must be closely monitored. In the present invention, such liquid consumption is readily apparent given that a single water bottle transfers between exercise activities.

It should be appreciated that there has been disclosed in accordance with the present invention, the preferred embodiment of an improved recreational water bottle system. It is evident that many alternatives, common modifications, and variations would be apparent to one of ordinary skill in the art in light of the description set forth herein. Accordingly, the present invention is intended to embrace all such alternatives, modifications, and variations that fall within the spirit and broad scope of the following appended claims.

I claim:

1. A recreational water bottle system comprising:
   a primary vessel for holding liquids having a watertight cap;
   a bottle tube extending through said cap into said primary vessel;
   a first drinking tube for delivering liquids to a user;
   a second drinking tube for delivering liquids to a user;
   an oversleeve disposed between said bottle tube and either of said first drinking tube or said second drinking tube for passing liquids between said bottle tube and either of said first drinking tube or said second drinking tube and for selectively holding said bottle tube and either of said first drinking tube or said second drinking tube in structural alignment;
   wherein said oversleeve is selectively removable from at least one of said bottle tube or said first or second drinking tubes; and
   said oversleeve engages at least one of said bottle tube or one of said first or second drinking tubes in a frictional fit engagement.

2. The recreational water bottle system of claim 1 further comprising:
   a mouthpiece including a one-way valve.

3. The recreational water bottle system of claim 1 wherein said cap includes a closable vent.

4. The recreational water bottle system of claim 1 further comprising:
   means for attaching said primary vessel to a user's body; and means for attaching one of said drinking tubes to a user's body.

5. The recreational water bottle system of claim 4 wherein said means for attaching said primary vessel comprises:
   a bottle compartment having an upper and lower end;
   a belt connected to said bottle compartment at its lower end; and
   stabilization straps connected to said belt and to the upper end of said bottle compartment for reducing bottle movement.

6. The recreational water bottle system of claim 1 further comprising:
   means for attaching said primary vessel to a bicycle frame; and
   means for attaching one of said drinking tubes to a bicycle frame.

7. The recreational water bottle system of claim 6 further comprising a spring sleeve disposed around one of said drinking tubes, and said means for attaching one of said drinking tubes comprises a mounting clip attached to one of said drinking tubes or said spring sleeve.

8. The recreational water bottle system of claim 6 wherein one of said drinking tubes comprises memory flex tubing.

9. A recreational water bottle system comprising:
   a primary vessel for holding liquids having a male threaded open end;
   an extension sleeve having a female threaded lower end adapted to engage said open end of said primary vessel, and a male threaded upper end;
   a watertight cap having a female threaded opening adapted to engage either of said primary vessel open end or said upper end of said extension sleeve;
   said watertight cap further comprising a closable vent;
   a bottle tube extending through said watertight cap into said extension sleeve and said primary vessel;
   a drinking tube for delivering liquids to a user;
   an oversleeve disposed between said bottle tube and said drinking tube for passing liquids between said bottle tube and said drinking tube and for holding said bottle tube and said drinking tube in structural alignment;
   wherein said oversleeve engages said bottle tube in frictional fit engagement and is selectively removable therefrom;
   means for attaching said primary vessel to the frame of a bicycle;
   means for attaching said drinking tube to the frame of a bicycle;
   said means for attaching said drinking tube comprising a mounting clip attached to said bicycle frame; and
   a mouthpiece including a one-way valve.

10. A recreational water bottle system comprising:
    a primary vessel for holding liquids;
    a watertight cap having a female threaded opening adapted to engage said primary vessel;
    a bottle tube extending through said watertight cap into said primary vessel;
    first and second drinking tubes for delivering liquids to a user;
    an oversleeve disposed between said bottle tube and one of said first or second drinking tubes for passing liquids between said bottle tube and one of said first or second drinking tubes and for selectively holding said bottle tube and one of said first or second drinking tubes in structural alignment through frictional engagement;
    bicycle mounted receiving means attached to a bicycle frame for selectively receiving said primary vessel; means for attaching said first drinking tube to said bicycle frame;
    body mounted receiving means attached to a user's body for selectively receiving said primary vessel; and
    means for attaching said second drinking tube to said user's body.

11. The recreational water bottle system of claim 10 further comprising
    means for selectively detaching said bottle tube from said oversleeve to permit the bottle to be used as a hand held sport bottle.

12. A recreational water bottle system comprising:
    a primary vessel for holding liquids having a male threaded open end;
    an extension sleeve having a female threaded lower end adapted to engage said open end of said primary vessel, and a male threaded upper end;
    a watertight cap having a female threaded opening adapted to engage either of said primary vessel open end or said upper end of said extension sleeve;
    a first drinking tube for delivering liquids to a user;
    a second drinking tube for delivering liquids to a user;
    a bottle tube extending through said cap into said extension sleeve and said primary vessel;
    an oversleeve for communicating liquids between said bottle tube and one of said first or second drinking tubes;
    means for selectively attaching said primary vessel to the frame of a bicycle;
    means for selectively attaching said first drinking tube to the frame of a bicycle;
    means for selectively attaching said primary vessel to the body of a user; and
    means for attaching said second drinking tube to the body of a user.

13. The recreational water bottle system of claim 12 further comprising:
    a spring sleeve disposed around said first drinking tube; and said means for attaching said first drinking tube comprising a mounting clip attached to said drinking tube or said spring sleeve.

14. The recreational water bottle system of claim 12 wherein one of said drinking tubes comprises memory flex tubing.

15. The recreational water bottle system of claim 12 further comprising:
    a mouthpiece including a one-way valve.

16. The recreational water bottle system of claim 12 wherein said cap includes a closable vent.

17. The recreational water bottle system of claim 12 wherein said means for selectively attaching said primary vessel to the body of a user comprises:
    a bottle compartment having an upper and lower end;
    a belt connected to said bottle compartment at its lower end; and
    stabilization straps connected to said belt and to the upper end of said bottle compartment for reducing bottle movement.

18. The recreational water bottle system of claim 12 wherein said means for selectively attaching said primary vessel to the frame of a bicycle comprises a quick release mounting cage.

* * * * *